United States Patent [19]

Havira et al.

[11] Patent Number: 4,885,723
[45] Date of Patent: Dec. 5, 1989

[54] ACOUSTIC APPARATUS AND METHOD FOR DETECTING BOREHOLE WALL DISCONTINUITIES SUCH AS VERTICAL FRACTURES

[75] Inventors: R. Mark Havira, New Fairfield, Conn.; Bronislaw Seeman, Meudon, France

[73] Assignee: Schlumberger Technology Corporation, New York, N.Y.

[21] Appl. No.: 332,120

[22] Filed: Dec. 18, 1981

[51] Int. Cl.$^4$ .............................................. G01V 1/40
[52] U.S. Cl. ...................................... 367/35; 181/105; 367/911
[58] Field of Search ...................... 367/31, 35, 75, 86, 367/25, 911, 912; 181/104, 105, 102

[56] References Cited

U.S. PATENT DOCUMENTS

| | | | |
|---|---|---|---|
| 3,406,776 | 10/1968 | Henry | 367/30 |
| 3,474,878 | 10/1969 | Loren | 367/35 X |
| 3,496,533 | 2/1970 | Semmelink | 181/104 X |
| 3,500,950 | 3/1970 | Roever | 367/35 X |
| 3,949,352 | 4/1976 | Vogel | 367/31 |
| 4,319,345 | 3/1982 | Dennis | 181/104 X |

*Primary Examiner*—Thomas H. Tarcza
*Assistant Examiner*—Ian J. Lobo
*Attorney, Agent, or Firm*—Clifford L. Tager

[57] ABSTRACT

Apparatus and methods are described for detecting fractures in a wall of a borehole penetrating an earth formation. An acoustic transducer produces pulses of acoustic energy at beam forming frequencies with the direction of the beam being so oriented as to preferentially excite transverse waves in the wall of the borehole. Discontinuities such as fractures cause a reflection of the transverse waves and these in turn are detected so that a positive identification of fractures is obtained. Fractures having various inclination angles are detected by employing apparatus and methods for scanning the acoustic beam while maintaining its orientation which preferentially enhances transverse waves. In this manner the transverse waves may be directed perpendicular to the fractures to enhance detectable reflections. A transducer employing an array of individually excitable acoustic elements is described with associated controls.

19 Claims, 4 Drawing Sheets

ACOUSTIC APPARATUS AND METHOD FOR DETECTING BOREHOLE WALL DISCONTINUITIES SUCH AS VERTICAL FRACTURES

FIELD OF THE INVENTION

This invention relates to an apparatus and method for detecting borehole wall discontinuities using an acoustic pulse echo technique. More particularly, this invention relates to an apparatus and method for detecting vertically oriented borehole discontinuities such as fractures.

BACKGROUND OF THE INVENTION

Techniques for the acoustic detection of fractures have been described in the art. These techniques involve the generation of an acoustic wave in the earth formation surrounding the borehole and detecting the degree of attenuation of an acoustic wave as it is strongly influenced by fractures in the path of the acoustic wave. Typically, the shear wave is recognized as not being transmitted through an open or fluid filled fracture. Hence, any crack or fissure in the earth formation in the path of a shear wave will strongly attenuate it. Known techniques for fracture detection thus involve transmitting an acoustic pulse into the formation and detecting the acoustic attenuation of the received waveform portion where the shear wave ought to be. A strong attenuation indicates the presence of a fracture and the orientation of the acoustic transmitter-receiver system relative to the borehole indicates the orientation of the fracture. Prior art patents which describe such transmissive attenuation type fracture detection techniques are the U.S. Pat. No. 2,943,694 to Goodman; U.S. Pat. No. 3,406,776 to Henry; U.S. Pat. No. 3,474,878 to Loren; U.S. Pat. No. 3,775,739 to Vogel and U.S. Pat. No. 3,794,976 to Mickler.

These prior art detection techniques involve reliance upon the transmissive influence by fractures, whose presence are deduced either from the absence of a shear signal or its very small amplitude when in view of the knowledge of the lithology of the formation, greater shear amplitudes would be expected. Since the receiver waveform from such fracture detection does not provide a positive indication of a signal representative of a fracture, its detection is more difficult.

Acoustic pulse-echo techniques have been described in the art to investigate boreholes; see, for example, U.S. Pat. No. 3,883,841 to Norel et al and U.S. Pat. No. 4,255,798 to Havira. These latter techniques involve the generation of an acoustic pulse to cause reflections from material interfaces in the path of the pulse. The reflections are then processed to evaluate the cement bond.

In the U.S. Pat. No. 3,502,169 to Chapman, a sonic borehole televiewer device is described to obtain a visual presentation of the wall of the borehole. An acoustic transmitter is used, operating in a frequency range of the order of about 2 MHz, to direct acoustic pulses at the borehole wall. The acoustic reflections from the wall are plotted as a function of azimuth, or circular scan to present a visual indication of wall fractures, cracks, as well as distinctions between hard and soft formations.

The U.S. Pat. No. 3,474,879 to Adair describes an acoustic pulse echo technique for scanning surface characteristics of a borehole with a rotationally mounted receiver-transmitter acoustic transducer. An acoustic beam generated by this transducer is directed at an angle relative to the borehole wall. The beam glances off with relatively little reflections in case of a smooth borehole wall, but when the beam is incident upon a wall discontinuity such as a cavern fracture or a rock interface, a detectable acoustic reflection is generated. The U.S. Pat. No. 3,464,513 to Roever teaches use of a similar system as in the Adair patent except that a plurality of stationary transducers are used to scan the periphery of the borehole wall.

The scanning of acoustic beams may be done mechanically as taught in the Adair patent or electronically as shown in the Roever patent or in U.S. Pat. No. 3,693,415 to Richard. Various techniques have been proposed to electronically steer an acoustic beam, see for example the U.S. Pat. No. 3,732,945 to Lavigne. An acoustic transceiver employing a flat array of transducers to enable the retrieval of a fish lost within a borehole is described in U.S. Pat. No. 3,935,338 to Aldrich et al.

SUMMARY OF THE INVENTION

In a borehole investigation technique in accordance with the invention, acoustic pulses are introduced by a tool mounted transmitter towards the borehole wall at a beam forming frequency and in such direction so as to promote the excitation of transverse acoustic waves in the borehole wall. The transverse acoustic waves do not traverse a fluid filled fracture, which, in response to the preferentially excited transverse waves causes a reflection towards an acoustic receiver on the tool. The acoustic receiver, which is located in the vicinity of the transmitter, or may be the same transducer as the transmitter, detects the acoustic reflections and produces a waveform signal representative thereof. The waveforms may then be recorded or further processed as indicative of reflected transverse waves to identify the presence of the fractures.

As described with respect to one form of the invention, acoustic pulses are introduced in the borehole medium by an acoustic transmitter operating at such frequency as to produce an acoustic beam whose principal direction lies in a reference plane. The reference plane for the purpose of detecting vertical fractures is generally transverse to the longitudinal axis of the borehole. The acoustic beam is further so oriented within the reference plane to direct the beam with a predetermined angle relative to the normal to the surface of the borehole wall region upon which the beam is incident so as to promote the generation of transverse waves such as shear or pseudo Rayleigh waves. The transverse waves travel away from the incidence region generally in a direction dictated by the incident acoustic beam. A highly angled fluid filled borehole wall discontinuity in the path of such transverse waves causes a substantial acoustic reflection which may then be detected by a sonic receiver.

Since the fractures of interest may occur over a range of inclination angles relative to the longitudinal borehole axis, the acoustic reflections produced by transverse waves travel away from the fractures in different directions. These directions are determined by the angle of incidence of the transverse waves with a normal to the fracture. Thus, for inclined fractures of interest, the primary or maximum amplitude reflections are not likely to be returned to the sonic receiver. In another form of the invention, therefore, the transmitter acoustic beam is further scanned so as to enhance detection of highly angled fractures over a desired range of inclination angles.

With the acoustic investigation technique in accordance with the invention, highly angled fractures are positively identified with a strong signal thus also enabling a precise determination of the location of such fractures in the borehole wall.

It is, therefore, an objection of the invention to provide a method and apparatus for the detection of borehole wall discontinuities such as highly angled fractures, cracks and edges of voids in a positive manner. It is still further an object of the invention to detect borehole wall discontinuities and precisely determine their positions on the borehole wall.

BRIEF DESCRIPTION OF THE DRAWINGS

These and other advantages and objects of the invention can be understood from the following description of several embodiments described in conjunction with the following drawings.

DETAILED DESCRIPTION OF EMBODIMENTS

Figures 1, 2, 3, 4:
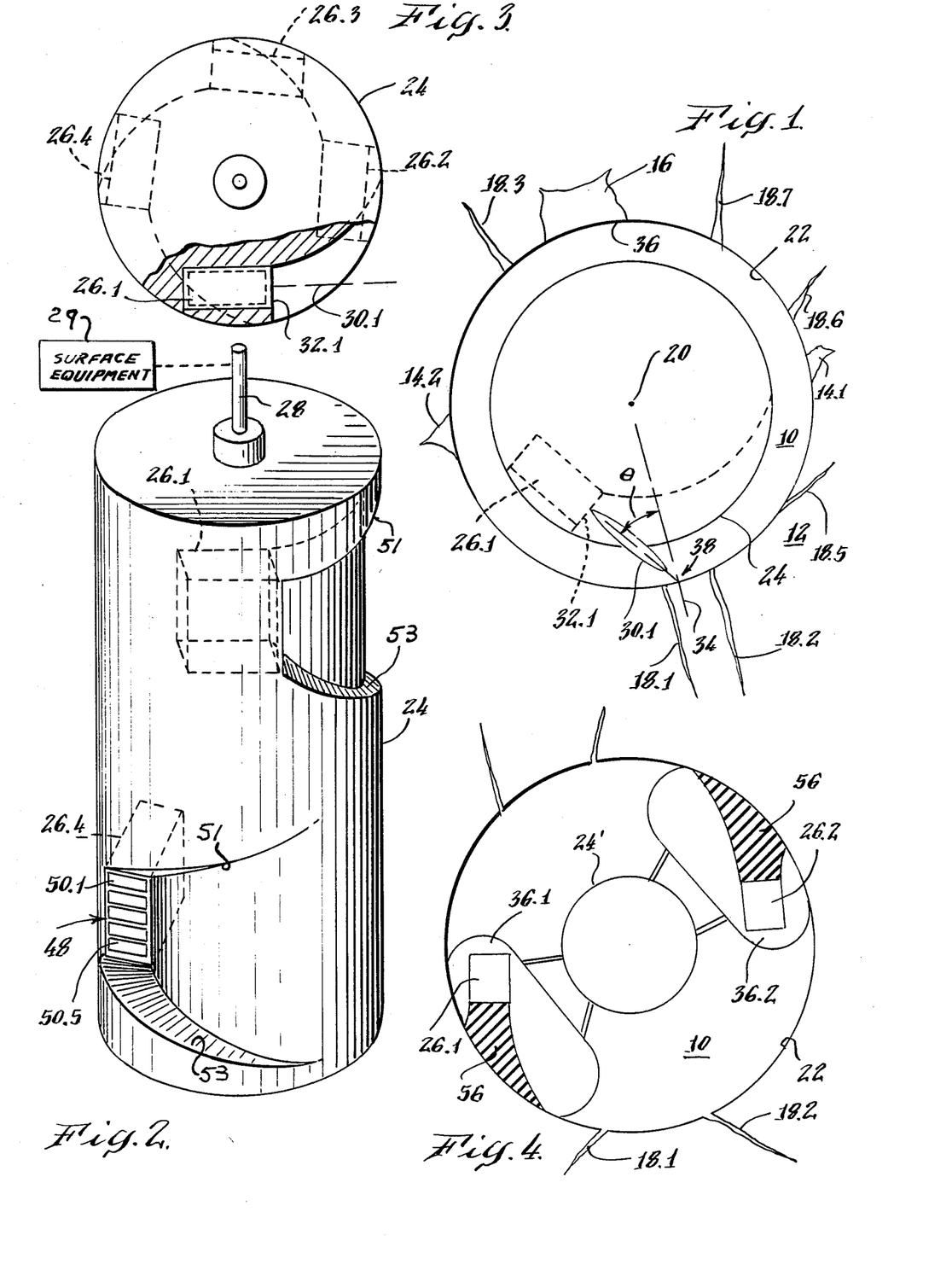
FIG. 1 is a horizontal section view of a tool located in a borehole for the detection of borehole wall discontinuities in accordance with the invention.
FIG. 2 is a perspective view of a portion of an apparatus in accordance with the invention for the detection of borehole wall discontinuities.
FIG. 3 is a top plan view partially broken away of the apparatus shown in FIG. 2.
FIG. 4 is a horizontal section of tool pads employed on a borehole wall with an apparatus in accordance with the invention.

With reference to FIGS. 1-3, a borehole 10 is shown formed in an earth formation 12. The borehole 10 may be a perfectly round hole, but in practice it is likely to have discontinuities in the form of short fissures such as 14 or a cavity such as 16. The borehole 10 also intersects discontinuities in the form of long fractures, which may be generally horizontally inclined such as when different earth layers are traversed by the borehole 10 or vertically inclined.

Of particular interest in the detection of natural gas or petroleum are borehole wall discontinuities in the form of vertically oriented fractures such as shown at 18. Such vertical fractures may be aligned with a radial of the borehole axis 20 such as fractures 18.1, 18.2 and 18.3, while other vertically oriented fractures such as 18.5, 18.6 and 18.7 intersect the borehole wall 22 chordally or tangentially.

According to one technique of this invention, an acoustic beam of energy is directed from a tool 24 carrying acoustic transducers 26.1-26.4. The tool is suspended from a cable 28 in borehole 10. Cable 28 is connected to surface located equipment 29 from which electrical power is obtained and to which measurements made with tool 24 are transmitted.

The acoustic transducers 26.1-26.4 are formed so as to be able to emit acoustic energy with a directivity as suggested by the beam 30.1 emanating from face 32.1 of transducer 26.1 in FIG. 1. The transducers 26.1-26.4 further are selected to be able to produce such beam-shaped acoustic energy in the form of short pulses. In this manner reflections produced by borehole wall discontinuities can be detected and waveform signals indicative thereof produced from the transducers during intervals between acoustic pulses. The formation of an acoustic beam is well known and is among other factors a function of the surface area of the emitting face 32 of transducers and frequency.

The operating frequency is selected sufficiently high so that the acoustic wavelengths employed enable formation of a beam, yet the frequency is sufficiently low to reduce the attenuation from borehole fluids such as drilling mud. An operating center frequency of the order of about 500 KHz may be used with a rectangular transducer face 32 surface area of about an inch wide by one and a half inch high. The transducers 26 are mounted on tool 24 so that their acoustic beams 30 are directed at a predetermined angle $\theta$ relative to the normal 34 to the borehole region upon which beams 30 are incident. The angle $\theta$ is so selected that the acoustic beams 30 promote generation of transverse waves in the borehole wall in a manner as taught, for example, by the previously identified U.S. Pat. No. 3,775,739 to Vogel. The transverse wave may be a shear wave or a pseudo-Rayleigh wave, both of which travel along the surface of a borehole wall 22.

In order to preferentially excite transverse waves in the borehole wall, the transducers 26 are so oriented that the sine of angle $\theta$ is approximately equal to the ratio of the velocity of sound in the borehole liquid to the velocity of the transverse wave to be exceited. This angle may thus vary, but when it is about 40° transverse waves are normally enhanced over a wide range of earth formation conditions. With an angle $\theta$ of about 40° the transducers 26 are located near the periphery of tool 24 and, if necessary, are mounted on pads 36.1, 36.2 as shown in FIG. 4.

In the operation of tool 24, short duration acoustic pulses are regularly generated by transducers 26, for example in the manner and of the type as shown in the U.S. Pat. No. 4,255,798 to Havira. Each acoustic pulse directs acoustic energy at the borehole wall 22 so as to promote the generation of a transverse wave. The transverse waves travel along the borehole wall away from the region such as at 38 upon which the acoustic beam 30 is incident.

Figures 5, 6:
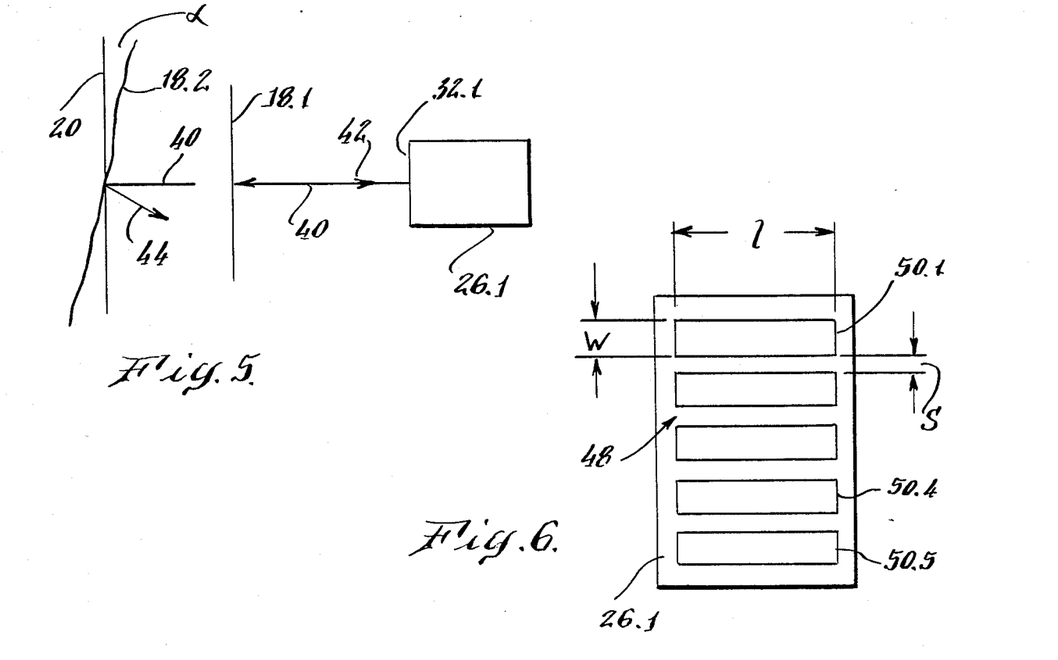
FIG. 5 is a simplified vertical schematic representation of a fracture detection technique with an apparatus in accordance with the invention.
FIG. 6 is a front schematic view of a transducer array employed in accordance with the invention.

When a fracture, such as 18.2 is in the path of the transverse wave, the liquid at the fracture interface is unable to pass the transverse wave, which is, therefore, reflected. The acoustic reflection, in turn, introduces acoustic compressional waves at the boundary with the borehole fluid. Since the transducer 26.1 is oriented to optimize sensitivity to transverse waves traveling along the borehole wall, a waveform signal representative of the transverse wave is obtained at the output of transducer 26.1. The reflections represent positive indications of the presence of fractures. FIG. 5 shows a simplified planar view of a path 40 followed by a transverse wave generated by a transducer 26.1. When a fracture such as 18.1 parallel to the borehole axis is encountered and is perpendicular to path 40, a reflection travels along the path 40 but in the direction indicated by arrow head 42 and is incident upon the face 32.1 of transducer 26.1.

The borehole may be inclined relative to the vertical of the earth and the fractures of interest may have inclinations relative to the earth vertical while still being of sufficient interest. The fractures of interest also may not all lie in a plane parallel to the borehole axis and may be in fact inclined with an inclination angle $\alpha$ with respect to the borehole axis 20 such as fracture 18.2. The transverse wave incident upon detection of such fracture 18.2 with a transverse wave traveling along path 40 is difficult because a reflection returns along a path such as 44, which depending upon the size of the inclination angle $\alpha$ may result in avoiding incidence upon transducer 26.1 and thus detection.

Detection of inclined fractures thus depends upon the operating beam width of transducer 26.1. This tends to be a function of frequency and at a center frequency of about 500 KHz is quite narrow, of the order of about seven degrees between the half power points. At such beam width, fracture inclination angles of only several degrees are detected since the reflections are reflected at twice the angle of inclination.

Although a plurality of transducers 26 could be employed with differently inclined fractures, a preferred technique in accordance with the invention employs a transducer 26.1 with an electronically steerable beam. This is obtained by using an array 48 of acoustically energizable and sensitive strip-shaped elements 50 with the array distributed along the direction in which the acoustic beam is to be scanned.

FIGS. 2 and 6 illustrate a transducer 26.1 on which the piezoelectric elements in the form of parallel rectangular shaped strips 50 are used. The number of elements 50 may vary, though five may be sufficient to yield an ability to scan over an angular range of ±20° relative to a plane which is substantially perpendicular to borehole axis 20. Such scan range is deemed sufficient to detect mot fractures of interest. The elements 50 are shown as exposed, though in practice they are protected by an appropriate acoustic coupling layer, which is deleted for clarity though shown in the view of FIG. 4. Techniques for forming such array of acoustic materials are known in the art; see, for example, the previously mentioned U.S. patents to Roever, Aldrich et al and others. As an example, the elements 50 may have a width, W, of 0.1 inches, a length, 1, of about one inch and separated from each other with a spacing, s, of about 0.010 inch. The transducers 26 are mounted adjacent the peripheral surface of the tool 24 so that the desired angle of incidence of the acoustic beam on the borehole surface 22 can be obtained. Since the acoustic beam is scanned, the portion of tool 24 in front of the arrays 48 is flared upward at 51 above the arrays 48 and downwardly at 53 below the arrays. The flare angles are selected sufficiently large to avoid interference with the steered acoustic beams and reflections caused thereby.

Figure 7:
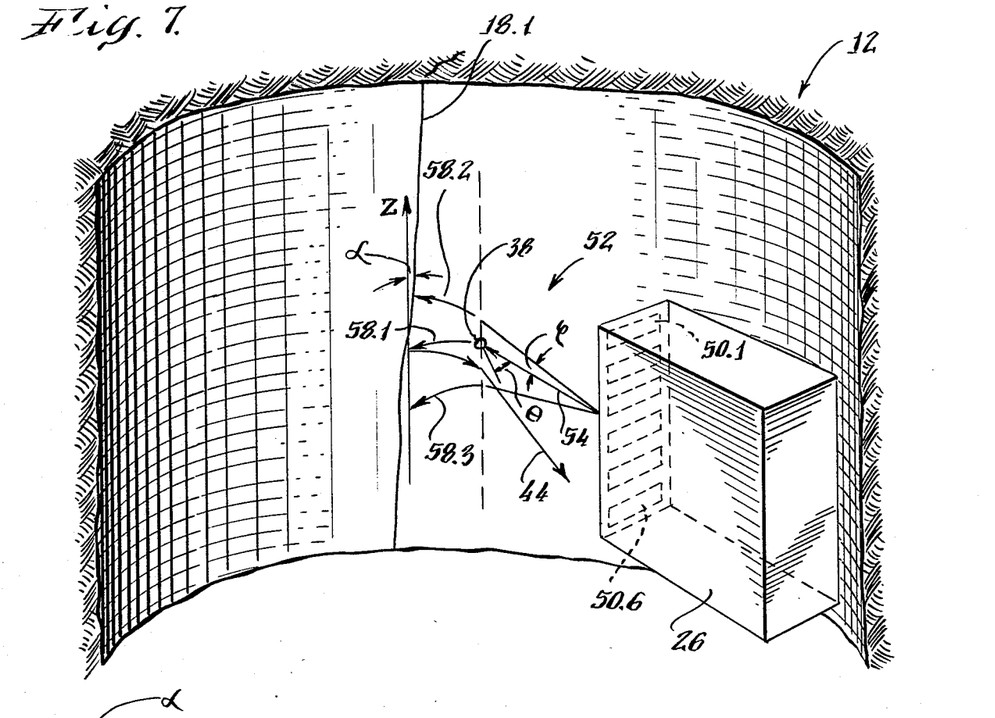
FIG. 7 is a perspective schematic view of a transducer and portion of a borehole wall having a highly angled borehole wall discontinuity.

In practice the acoustic path followed by the acoustic pulses and reflections is not the simplified planar representation as shown in FIG. 5, but a more complex path 52 as illustrated in Fig. 7. There, acoustic pulses are launched at the borehole wall 22 along an initial path 54 through the borehole with a tool 24 as shown in FIG. 2 or through an acoustic coupling layer 56 as illustrated in FIG. 4 until the acoustic energy is coupled into the borehole wall 22 at a region 38. The acoustic coupling layer may be formed of an appropriate impedance matching material as is well known in the art.

Acoustic waves then propagate away from region 38, generally along a path 58.1 and in a direction determined by the angle of incidence of the acoustic pulse at region 38. The path 58 lies along a circular portion of the normally cylindrical borehole wall 22 in the case of a direction for path 54 which lies in a plane which is perpendicular to the borehole axis 20.

When, however, the beam direction 54 is scanned by the array 48, such as along a plane parallel with the borehole axis, the resulting travel paths 58.2 and 58.3 are non-circular so that at least one set of preferentially enhanced transverse waves traveling along 58.2 may intersect a fracture such as 18.1 along a perpendicular direction thereto.

With the use of a scannable acoustic beam, fractures may be detected over a range of inclination angles depending upon the orientation of the transducers 26. In the embodiment of tool 24 in FIG. 2, the transducers are oriented to detect vertical fractures having high inclination angles as measured relative to a plane which is perpendicular to the borehole axis. The tool 24 is held within the center of the borehole 10 with centralizers (not shown) which are well known in the art. In FIG. 4 a tool 24' is used employing wall engaging pads and in which transducers such as 26 are mounted to scan for and detect vertical fractures.

Scanning of the acoustic beam of transducer 26 is obtained by controlling the time when each element 50 in the array 48 is activated during a transmit mode, or sampled during a receive mode.

Figure 8:
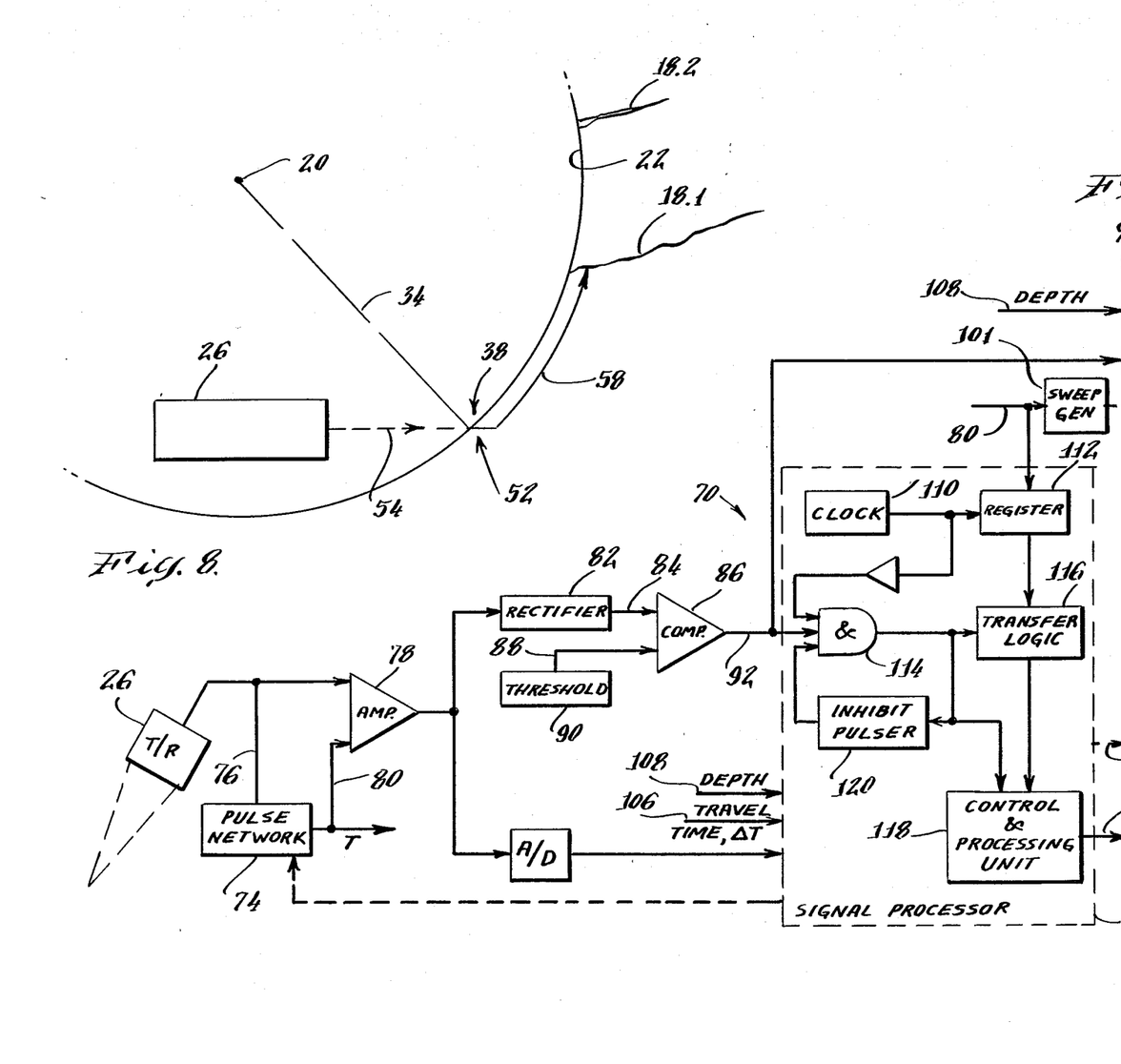
FIG. 8 is a schematic view of a fracture detection technique taken in a plane which is transverse to the axis of the borehole.
Figure 9:
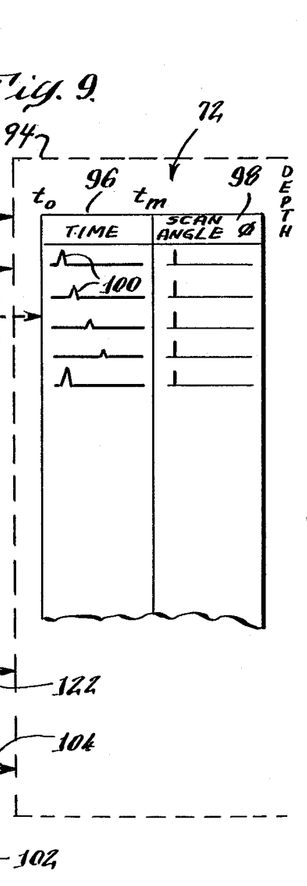
FIG. 9 is a schematic block diagram of a signal processing network used to form a log of reflections attributable to high angled fractures detected in accordance with the invention.

With reference to FIGS. 8 and 9, a network 70 is shown for generating a log 72 to indicate borehole wall discontinuities as a function of depth. The log 72 may be made by storing signals on a magnetic medium or in the memory of a data processor or a visible record as shown in FIG. 9 may be formed. A pulse network 74 provides transducer 26 with electrical drive pulses on line 76 while disabling a receiver amplifier 78 with a signal, T, on line 80. At the end of a transmitter pulse, the disabling signal on line 80 is removed and reflection signals representative of acoustic reflections on line 76 from transducer 26 are amplified by amplifier 78.

The amplified reflection signals are applied to a full-wave rectifier 82 whose output 84 is compared by a comparator 86 with a threshold value on line 88 from a threshold network 90. In the event the threshold value is exceeded, a reflection signal appears on output line 92 which is applied to recorder 94 with which log 72 is formed. The reflection signal on line 92 has an amplitude representative of the amplitude of the acoustic reflections. In this manner the magnitude and time of arrival of reflections as recorded on log 72 are indicative of the distance of transducer 26 from a borehole wall discontinuity such as fracture 18.1.

Log 72 is formed of a time log 96 on which reflections 98 from fractures are recorded. In addition, a scan angle log 100 is employed to indicate the inclination angle of the fracture. For the time-log 96 the recorder 94 is provided with a time sweep signal representative of the time following a common event such as a transducer acoustic pulse, $t_o$, to thus indicate the time interval when a reflection from a borehole wall discontinuity is detected relative to this common event. The time sweep signal commences its sweep signal with the actuation of the transducer 26 and terminates a predetermined maximum time, $t_m$, thereafter. The time sweep signal may be obtained with a generator 101 or a signal processor 102. The duration of the time-sweep signal is selected sufficiently long to enable the recording of reflections which exceed the threshold level from threshold network 90 and may occur over the operating range of the transducers. The successive arrivals of the reflections or the intervals of time relative to the common event may thus be used to indicate the relative inclination of a discontinuity such as a fracture with respect to the direction of logging by tool 24 in the borehole.

The signal processor 102 is preferably employed for controlling scan angles as well as generate signals indicative of the scan angle at which recorded reflections 100 were detected when a beam scanning mode is employed. Alternatively to the use of a sweep signal from the sweep generator 101, the signal processor 102 can produce a sweep signal on line 104 as a function of the acoustic wave velocity in the earth formation for the depth at which the transducers 26 are located for a more accurate indication on log 96 as to the angular location and inclination of fractures on borehole wall 22.

FIG. 8 illustrates how the path length 54 through the borehole medium in case of a tool as in FIG. 2 or through the coupling layer 56 in case of a pad arrangement as in FIG. 4 can be estimated. The two-way travel time of the acoustic pulse along path 54 can be calculated using the scan angle $\phi$ and the known velocity of an acoustic pulse through the borehole medium. The velocity of transverse waves in the earth formation along path 58 may be generally known from acoustic velocity or travel time interval ($\Delta T$) measurements in units such as microseconds per foot as a function of depth for borehole 10. Hence, either signals representative of $\Delta T$ and depth measurements are applied to a signal processor 102 on lines 106, 108 or stored in memory associated with the signal processor.

One technique for determining the azimuth of a fracture includes a measurement of the time lapsed between the detection of a reflection and the generation of the acoustic pulse which produced it. This measurement may be made inside signal processor 102 with a clock 110 applied to drive a register 112 which is reset to a particular value each time the transducer 26 is activated with the signal on line 80.

Hence, when an acoustic reflection is detected and a reflection signal indicative thereof occurs on line 92, an AND gate 114 is enabled to transfer the count of register 112 via transfer logic network 116 to a control and processing unit 118 in signal processor 102. While this transfer occurs, an inhibit network 120 is activated to inhibit further transfers for a time estimated sufficient for the reflection signal to pass.

A signal indicative of the length of path 58 to a borehole discontinuity may then be derived by subtracting the two way travel time of the acoustic energy along path 54 and dividing the remainder by the interval travel time of the acoustic transverse waves for the particular earth formation depth.

The signal processor 102 may transform the length of path 58 to an azimuth position for the fracture 18.1 based upon the known placement of transducer 26 on the tool 24 and the known path length 54 by using known geometric relationships. An azimuth signal may then be produced on a line 122 and applied to recorder 94 to record the angular position of the detected borehole wall discontinuity.

The network 70 has been described for use with a single transducer 26. In such case a single fracture 18.1 along the path 58 can be detected, fractures such as 18.2 lying behind the first fracture are less likely to be detected. Accordingly, as shown in the embodiment for tools 24, 24' in FIGS. 2 and 4, a plurality of transducers 26 are employed to each investigate a portion of the borehole wall for discontinuities. Network 70 is correspondingly expanded to accommodate the signals to and from additional transducers.

Figure 10:
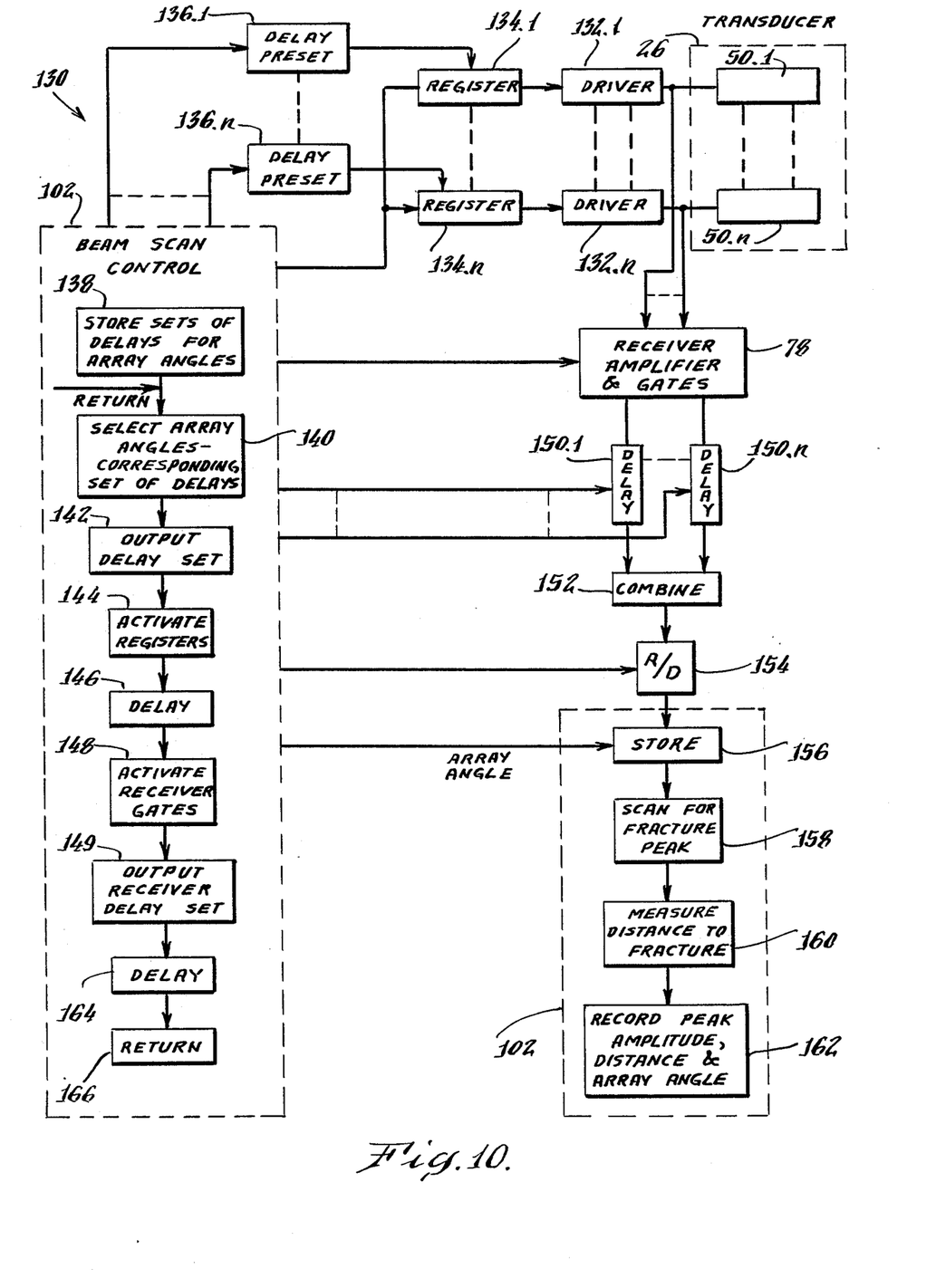
FIG. 10 is a block diagram of a technique for controlling and operating an acoustic transducer in a beam scanning mode in accordance with the invention.

FIG. 10 illustrates one technique 130 for controlling the beam scanning mode for a transducer 26 having an array 48 of separately energized strip elements 50. The elements 50 are sequentially energized with slight delay intervals depending upon the desired direction of the acoustic beam. Following activation of the elements 50, they are used in a receive mode and combined in accordance with direction determining delays. The receive mode is active for a time period sufficient to detect the presence of borehole wall discontinuities within a predetermined distance from the transducer 26. This distance is strongly affected by the amount of attenuation. Normally, a two way travel distance limit of about six inches may be imposed so that the number of transducers 26 employed to investigate the entire borehole wall may be correspondingly increased depending on the perimeter length of the borehole.

In the technique 130 of FIG. 10, a signal processor, such as 102 of FIG. 9, is employed to control and set the delays needed to scan the acoustic beam during the transmit mode and combine the receiver outputs during the receive mode. Each element 50 in the transducer array 48 is connected to a separately energized drive circuit 132 and separate amplifier such as 78 in FIG. 9.

The drive circuits 132 in turn are energized by pulses from individual registers 134, each of which produce an output pulse for one acoustic beam pulse at the appropriate delay time as a function of preset delay counts from counters 136. The preset delay counts are selected to, for example, step the acoustic beam through fixed scan positions, e.g. eight for a maximum scan range of about forty degrees ($\pm 20°$ relative to a plane such as which is perpendicular to the borehole axis 20).

At 138 the respective sets of delays needed to scan the acoustic beam are stored for various array beam angles and at 140 the discrete scan angles for the acoustic beam are selected so that the corresponding delays can be output at 142 in the proper sequence to the delay preset counters 136.

The registers 134 are then activated at 144 so that each produces an output pulse to a drive circuit 132 at the proper delayed instant while the receiver gates are inhibited. A short delay at 146 is provided following the generation of an acoustic pulse. The receiver gates 78 are then enabled at 148 and the receiver outputs are passed through variable delay lines 150 having delays set at 149 in correspondence with the delays previously employed in counters 136. The outputs from the delay lines 150 are combined in a summing network 152 to provide a single receive waveform signal from transducer 26 for the particular array scan angle. The combined waveform may then be converted to digital form with an analog to digital converter 154 and the waveform stored in memory at 156.

At 158 the stored waveform is scanned for a peak value indicative of the presence of a fracture. At 160, the time position of the detected peak in the waveform is transformed to a distance to the fracture from the receiver and this measurement, together with the peak amplitude and scan angle are recorded at 162.

Following the receive mode, a slight delay is implemented at 164 followed by a return at 166 to step 140 for an acoustic investigation for the next successive beam scan angle position.

The receiving mode may be implemented by sampling each of the waveform signals obtained from a strip element 50 for the interval of interest and then storing the samples in a memory of signal processor 100. The stored samples of different waveforms may then be combined with time shifts which correspond with the delays set for the waveforms in counters 136. This technique may be performed within a signal processor located either downhole in tool 20 or above ground.

Having thus described an apparatus and method for the detection of fractures, the advantages of the invention can be understood. Variations from the described embodiments can be made without departing from the scope of the invention.

What is claimed is:

1. An acoustic investigation method for detecting fluid filled fractures in a wall of a borehole penetrating an earth formation comprising the steps of:
    generating from inside the borehole acoustic energy at a beam forming frequency for travel towards the borehole wall along a direction selected to preferentially excite transverse acoustic waves in the borehole wall;
    detecting acoustic reflections attributable to the incidence of said transverse acoustic waves upon fluid filled fractures in the borehole wall; and
    recording signals representative of said acoustic reflections caused by said fractures.

2. The acoustic borehole investigation method as claimed in claim 1 wherein said generating step further includes, while substantially maintaining said preferential excitation of transverse waves, the step of varying the direction in which acoustic pulses are incident upon the borehole wall to detect fractures within a predetermined range of inclination angles thereof.

3. The acoustic borehole investigation method as claimed in claim 2 wherein said varying step comprises changing the direction of the beam of pulses generally within a plane which is parallel to the longitudinal axis of the borehole over a preselected range of angles to enable the detection of vertical fractures whose inclination angles relative to said plane are within said predetermined range.

4. The acoustic borehole investigation method as claimed in claim 3 wherein said direction varying step preselected range of angles is about forty degrees.

5. The acoustic borehole investigation method as claimed in claim 2 or 3 further including the steps of:
    storing the direction of the acoustic beam which caused a detected reflection; and
    determining the inclination angle of the fracture causing the detected reflection from said stored direction.

6. The acoustic borehole investigation method as claimed in claim 1, 2 or 3 wherein said recording step further includes the step of:
    recording said signals to indicate the interval following generation of said acoustic beam energy to provide an indication of an inclination of said fractures.

7. An acoustic investigation method for detecting discontinuities in a wall of a borehole penetrating an earth formation comprising the steps of:
    directing from inside the borehole pulses of acoustic energy each at beam forming frequencies towards the borehole wall with orientations of the beams selected to preferentially enhance the excitation of transverse acoustic waves traveling away from the borehole wall segments in directions determined by the angle of incidence of the acoustic beams upon the borehole wall segment,
    while substantially maintaining said beam orientations, varying the direction which said acoustic beams are incident upon said borehole wall segments to correspondingly vary the directions which said transverse waves travel from said borehole wall segments;
    detecting acoustic reflections produced by said transverse waves when these are incident upon a discontinuity in the borehole wall;
    deriving fracture signals representative of the presence of a said discontinuity from said detected acoustic reflections; and
    recording said derived signals.

8. The acoustic investigation method for detecting borehole wall discontinuities as claimed in claim 7 wherein said detecting step further includes:
    storing detected reflections as a function of scan angles of the acoustic beams, wherein the scan angles are representative of the varied directions of the acoustic beams.

9. The acoustic investigation method for detecting borehole wall discontinuities as claimed in claim 8 wherein said deriving step further includes:
    selecting from the stored reflections the reflection having the maximum amplitude and designating the corresponding scan angle as indicative of the orientation of the discontinuity.

10. The acoustic investigation method for detecting borehole wall discontinuities as claimed in claim 7 wherein said fracture signals are derived by determining the time intervals for the detection of said acoustic reflections relative to a common event, said time intervals being representative of a relative inclination of said discontinuity.

11. The acoustic investigation method for detecting borehole wall discontinuities as claimed in claim 7, 8, 9 or 10 wherein said acoustic beams are directed at predetermined angles relative to a plane which is perpendicular to the borehole axis to detect vertical borehole discontinuities of different inclination angles.

12. An apparatus for detecting discontinuities in a wall of a borehole penetrating an earth formation with a tool sized to move through the borehole comprising:
    means for generating a beam of acoustic energy in the form of pulses at the wall of the borehole with an orientation selected to preferentially excite transverse waves traveling in the borehole wall away from a borehole wall region on which the beam of acoustic energy is incident;
    means for scanning said beam of acoustic energy while substantially maintaining said preferential excitation of transverse waves to detect borehole wall discontinuities having different inclination angles; and means for detecting acoustic reflections produced by said preferentially excited transverse waves and produce a signal representative thereof to indicate the presence of borehole wall discontinuities.

13. The apparatus for detecting discontinuities in a wall of a borehole as claimed in claim 12 wherein said acoustic beam generating means further comprises:
an acoustic transducer formed with a plurality of parallel aligned strip elements which are spaced from each other to form an array,
and wherein said scanning means further comprises means for controlling individual excitation of said strip elements to correspondingly regulate scanning of said acoustic beam.

14. The apparatus for detecting discontinuities in a wall of a borehole as claimed in claims 12 or 13 wherein said acoustic beam generating means further is so located to enable scanning of said beam with respect to a plane which is substantially perpendicular to the borehole axis to detect vertical borehole wall discontinuities.

15. The apparatus for detecting discontinuities in a wall of a borehole as claimed in claim 14 wherein said strip elements are selected and oriented to provide a scanning range of the order of about forty degrees.

16. The apparatus for detecting discontinuities in a wall of a borehole as claimed in claim 12 or 13 and further including:
means for generating fracture signals representative of time intervals of detected acoustic reflections relative to a common event, said fracture signals being indicative of a relative inclination of a said discontinuity.

17. The apparatus for detecting discontinuities in a wall of a borehole as claimed in claim 14 wherein said acoustic beam generating means is mounted near a radial periphery of the tool to operatively face in a generally tangential direction therefrom.

18. The apparatus for detecting discontinuities in a wall of a borehole as claimed in claim 14 wherein said tool is provided with a borehole wall engaging pad and said acoustic beam generating means is mounted in said pad.

19. The apparatus for detecting distontinuities in a wall of a borehole as claimed in claim 14 and further including:
means for generating signals representative of the inclination angles of detected borehole discontinuities.

* * * * *